May 10, 1966  J. D. WINSLOW, JR., ETAL  3,250,695
VOLTAGE CONTROL SYSTEM
Filed July 12, 1962  4 Sheets-Sheet 1

INVENTORS
JOSEPH D. WINSLOW, JR.
WILLIAM L. SHIRLEY
BY THEIR ATTORNEYS
HARRIS, KIECH, RUSSELL & KERN

May 10, 1966  J. D. WINSLOW, JR., ETAL  3,250,695
VOLTAGE CONTROL SYSTEM
Filed July 12, 1962  4 Sheets-Sheet 2
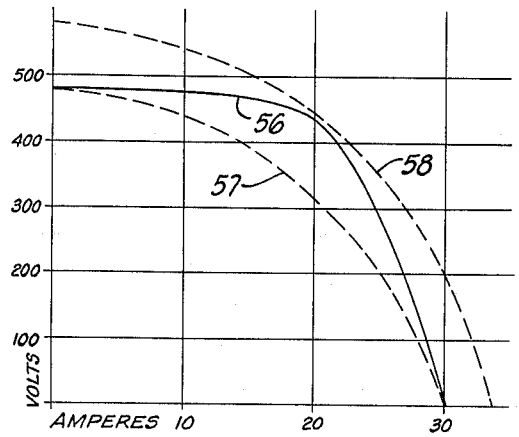
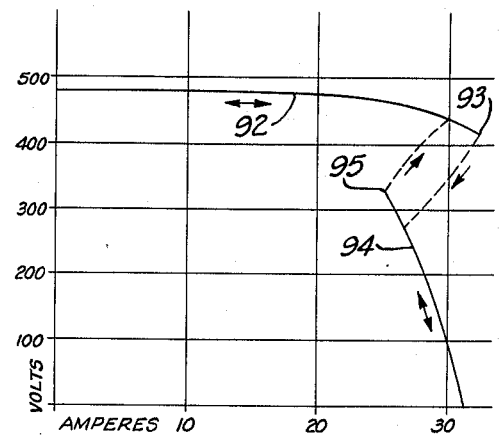
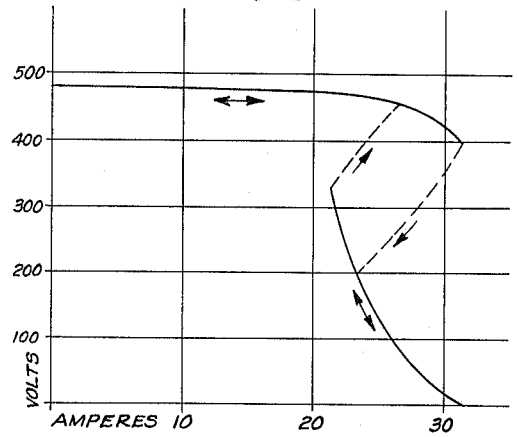
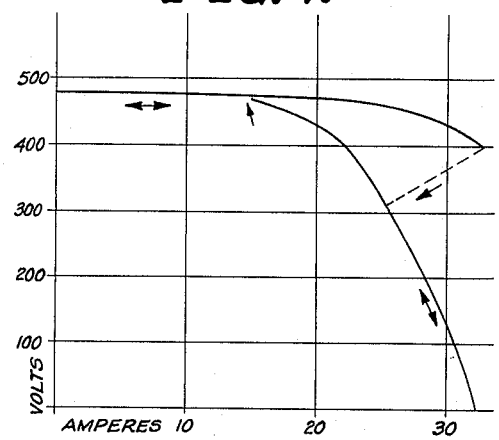
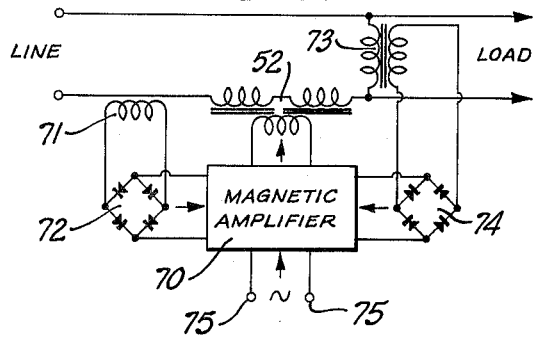
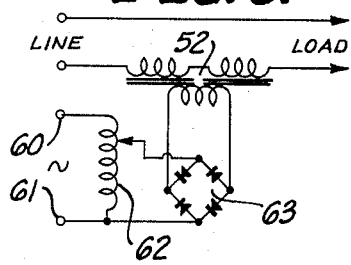
INVENTORS
JOSEPH D. WINSLOW, JR.
WILLIAM L. SHIRLEY
BY THEIR ATTORNEYS
HARRIS, KIECH, RUSSELL & KERN

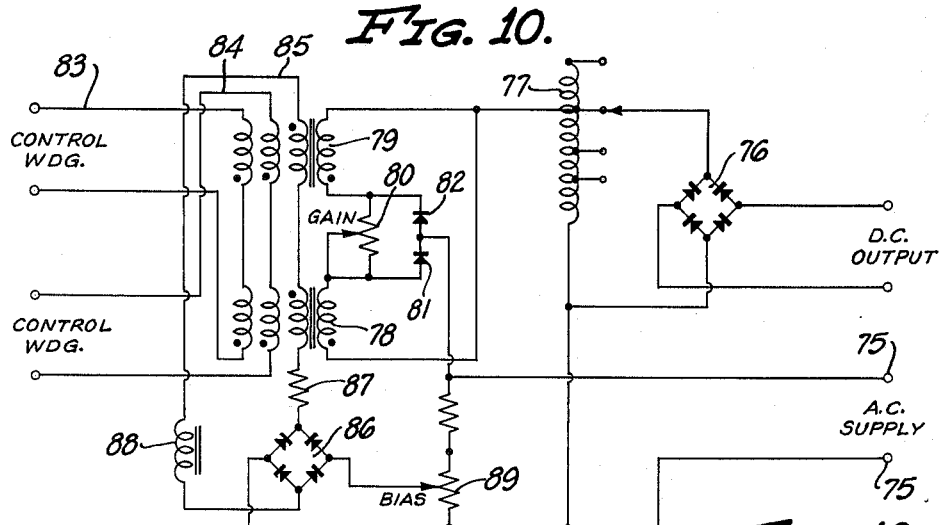
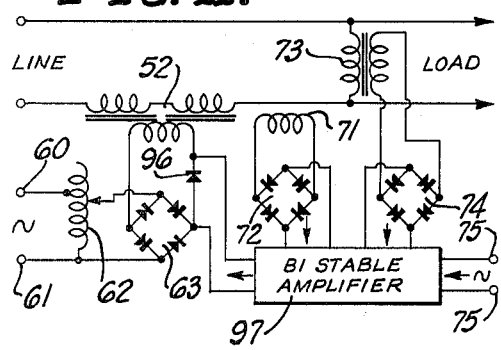
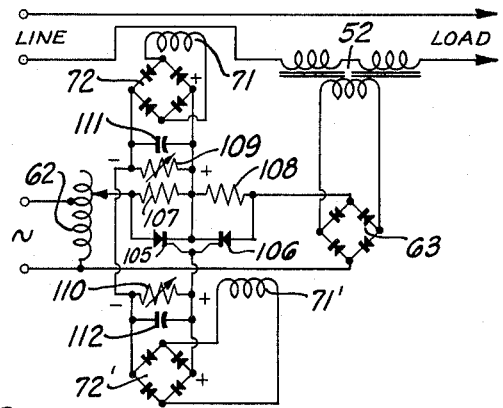
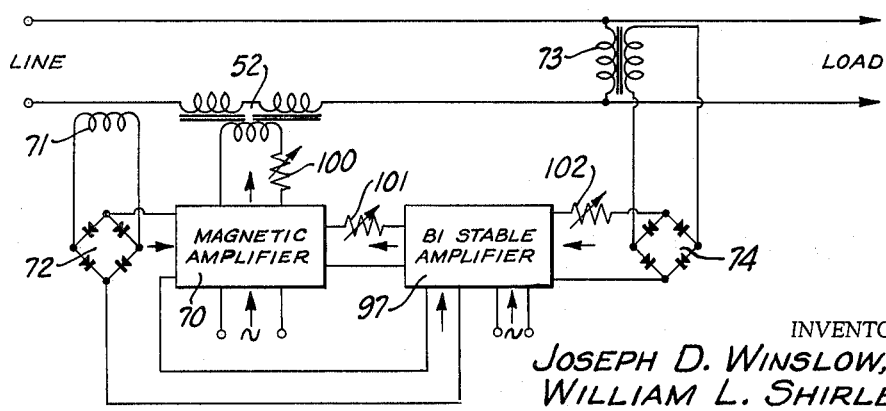

May 10, 1966  J. D. WINSLOW, JR., ET AL  3,250,695
VOLTAGE CONTROL SYSTEM
Filed July 12, 1962  4 Sheets-Sheet 4

INVENTORS
JOSEPH D. WINSLOW, JR.
WILLAM L. SHIRLEY
BY THEIR ATTORNEYS
HARRIS, KIECH, RUSSELL & KERN

United States Patent Office 3,250,695
Patented May 10, 1966

3,250,695
VOLTAGE CONTROL SYSTEM
Joseph D. Winslow, Jr., Bellaire, and William L. Shirley, Houston, Tex., assignors to Petrolite Corporation, Wilmington, Del., a corporation of Delaware
Filed July 12, 1962, Ser. No. 209,443
12 Claims. (Cl. 204—305)

This invention relates to voltage control systems and, in particular, to voltage control systems for use with relatively high and randomly varying current loads. With some types of loads, it is desirable to maintain the operating voltage at the load during the random variations in current load until a maximum or critical or breakdown load occurs at which time it is desired to substantially reduce the operating voltage. The operating voltage at the load should be increased as soon as the overload or critical load condition is eliminated or reduced, so as to obtain the maximum operating time for the load at or near the line voltage.

A typical load for which the voltage control system of the invention is intended to be used is an electric emulsion treater adapted to treat oil-continuous emulsions to separate the dispersed phase thereof, composed of drops of a material of higher electrical conductivity, often aqueous in nature as will be assumed in the exemplification of the invention herein. Such a treater utilizes two or more spaced electrodes immersed in the fluid being treated, with a high electrical potential between the electrodes to maintain a high-voltage electric field therebetween. It is desirable to maintain the potential between the electrodes substantially constant while the conductivity of the emulsion varies in order to achieve maximum efficiency of treater operation.

The conductivity of the oil being treated is normally influenced by the droplets of water dispersed in the oil, with the quantity, size and relative positions of the droplets varying randomly during the operation of the treater and thereby producing a randomly varying current load. Occasionally groups of the water droplets are lined up by the action of the electric field and form a very low resistance path between the electrodes resulting in a very high current load until this chain of droplets is disrupted. It is desirable to maintain the voltage and current in a treater under such chaining conditions as the high current through the water chain will normally vaporize the water and eliminate the short circuit. But of course, protection must be provided for the entire system against currents and voltages which exceed predetermined critical or maximum values. This type of operation could be achieved by operating the load at line voltage until the maximum current is exceeded and then disconnecting the load from the line. However, it is highly desirable to avoid completely disconnecting the load from the line so that operation of the treater is not completely disrupted, permitting the electrode potential to build up to the operating value as soon as the excess current condition is dissipated.

Various mechanical circuit breaker devices are available for overload current protection. However, the mechanical devices with moving contacts are to be avoided whenever possible. Also, when using automatic reclosing arrangements, oscillation of the breaker is sometimes encountered. Another disadvantage lies in the fact that breakers are an off-on type of device and do not provide voltage control.

Air gap reactors are presently being used for voltage control with randomly varying current loads of the type discussed above. The air gap reactor does provide positive overload protection for the system but introduces a serious loss in treating effectiveness. The voltage-current characteristic of the air gap reactor is relatively steep, normally being a quadrant of a circle or ellipse as will be shown below, and its use introduces serious high voltage problems with high resistance loads.

Another serious disadvantage of the air gap reactor voltage control system lies in the poor power factor and high line voltage requirements introduced by the reactor. For example, a connected load of two amperes at 12,000 volts (24 kva.) requires an air gap reactor and related equipment rated at 50 kva. with the voltage at zero load current being 16,000 volts.

It has been found that a voltage control system utilizing a saturable core reactor can be successfully used for voltage control with randomly varying current loads, overcoming the disadvantages discussed above and providing unexpected improvements in operation and results. The saturable core reactor system permits the use of much lower kva. ratings of equipment with the same load voltage and current or a substantial increase in load voltage for the same kva. rating equipment as compared with the air gap reactor system. The saturable core reactor system permits maintenance of substantially constant load voltage for varying currents while providing both continued electric treatment of the oil in a desirable manner and the overload protection desired for the equipment. The saturable core reactor system eliminates the high voltage problem for zero or low load currents and also provides a fail safe characteristic for the entire system. With the saturable core reactor system, the power factor of the voltage controller and load is substantially improved resulting in an improvement in the economics of the system as well as in the performance. Referring to the numerical example given above in connection with an air gap reactor system, a saturable core reactor voltage control system for the same connected load requires only a 25 kva. capacity with a zero current line voltage of 12,000 volts.

Accordingly, it is an object of the present invention to provide a voltage control system for a randomly varying current load such as an electric emulsion treater utilizing a saturable core reactor as the main control unit. A further object is to provide such a control system in which the saturable core reactor may be series connected or parallel connected. Another object is to provide such a control system which may utilize a single saturable core reactor or a plurality of such reactors.

It is an object of the invention to provide a voltage control system for operating a piece of equipment which produces a randomly varying current load at a pair of load terminals and including saturable core reactor means connected between A.C. power source terminals and the load terminals for controlling power transmission to the load with the reactor means having a voltage-current characteristic with a substantially constant voltage portion and a knee, a D.C. current source, circuit means for connecting the D.C. source to the control winding of the reactor means, and means for varying the D.C. current from the source for setting the reactor means in the substantially constant voltage condition at the normal load current thereby permitting operation at the substantially constant voltage with increased loads before reaching the knee. A further object is to provide such a system in which the D.C. control winding current is set at a particular value and maintained substantially constant during the operation of the system. Another object is to provide such a system in which the D.C. control winding current is varied as a function of the load for improving the constant voltage characteristic of the system. Still another object of the invention is to provide such a system in which the D.C. control winding current is switched between two values as a function of load for maintaining the system at a first substantially constant voltage condition until a critical load current is exceeded and then switching the system to a second and considerably lower voltage condition, with the system being switched back to the first condition when the load current decreases to a predetremined value.

It is a particular object of the invention to provide a voltage control system for a randomly varying load in the form of an electric emulsion treater and including high voltage stepup transformer means having a primary and a secondary, saturable core reactor means connected between the A.C. power source terminals and the transformer primary for controlling power transmission to the primary, a D.C. current source, circuit means for connecting the D.C. source to the control winding of the reactor means, a container for fluid to be treated and including an inlet and upper and lower outlets for fluid flow therethrough, a pair of electrodes mounted within the container in spaced relation for fluid flow therebetween, and circuit means for connecting the transformer secondary to the pair of electrodes to apply a high electrical potential between the electrodes. A further object is to provide such a voltage control system that may be used with treaters in which one of the electrodes is grounded and treaters in which both of the electrodes are operated at a high potential with respect to ground.

An electric emulsion treater incorporating the invention has been found to produce better and more consistent treatment as compared with the use of an air gap reactor or choke coil. When using the latter the treater functions to produce a treated oil having a residual amount of dispersed material or BS & W that is a function of the amount thereof in the incoming oil to be treated. With the system of the invention the residual BS & W is substantially independent of changes in the BS & W content of the incoming stream and is instead a function of the electrode voltage. This is an important characteristic inasmuch as it is desirable in commercial electric treating systems to keep the BS & W of the treated oil below a given level irrespective of periodic changes in the BS & W content of the incoming oil. It is an object of the invention to provide an electric emulsion treater having such characteristics.

The invention likewise provides an improved way of protecting the equipment against the danger of forming combustible mixtures inside the treater should the container not remain full of oil. In prior practice it has been common to use a float switch connected to interrupt the current to the primary of the high-voltage transformer should the oil level drop. This has required the interruption of a circuit that may be carrying a large current. In other instances it has been proposed to use a level-responsive device to short circuit or ground the electrodes of the treater, using an air core reactor or choke coil to limit the current to the primary of the transformer. Both systems are open to objection.

It is an object of the invention to connect the control winding of the saturable core reactor to a level-responsive switch whereby the D.C. control current is disconnected or substantially decreased to reduce the load current before the transformer primary circuit is shorted or the electrode voltage otherwise nullified. A further object is to delay the shorting of the primary circuit or the grounding of the electrodes until the interruption of the D.C. current in the control circuit has lowered the load voltage to a small fraction of its normal value.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIGS. 4, 5, 6 and 7 are graphs illustrating characteristics of various control systems;

FIGS. 8 and 9 are electrical schematics of D.C. current sources for use with the control system;

FIG. 10 is a schematic of a magnetic amplifier suitable for use in the apparatus of FIG. 9;

FIGS. 11, 12 and 13 are electrical schematics of alternative forms of D.C. current sources for use with the control system.

Figure 1:
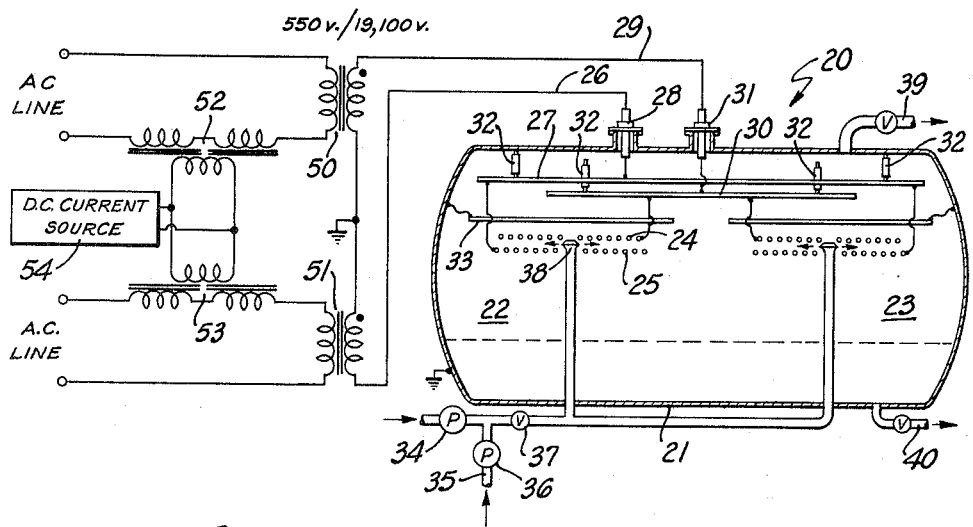
FIG. 1 is a diagrammatic illustration of a preferred embodiment of the invention.

The voltage control system of FIG. 1 is shown with a horizontally disposed dual treater 20. A container 21 in the form of a cylinder with closed ends provides two identical treating zones 22, 23 therein. Upper and lower electrodes 24, 25, each comprising a plurality of horizontally disposed rods, are positioned in the treating zone 22. An electrical line 26 is connected to a distribution bus 27 within the container through a feedthrough bushing 28. Another electrical line 29 is connected to a distribution bus 30 through another feedthrough bushing 31. The busses 27 and 30 are suspended from the wall of the container on insulators 32. The upper electrode 24 is energized from the bus 30 and the lower electrode 25 is energized from the bus 27. A fluid flow distribution plate 33 may be positioned above the electrodes and normally is connected to the container 21 which in turn is connected to circuit ground.

The oil to be treated is pressured by a pump 34. In some instances a supplementary liquid is desirably mixed therewith, as in the electric desalting process of U.S. Patent No. 2,182,145. In such instance a small amount of water or other liquid is introduced from a line 35 in amount controlled by a pump 36. A mixing device such as a mixing valve 37 mixes the two streams to form the emulsion to be treated. The latter is discharged into the interelectrode treating space as a thin sheet discharging radially from a distributor 38 which is electrically connected to the container 21. The treated or desalted oil leaves the container through a line 39 and water or other material coalesced by the electric field and separated from the oil in the container 21 leaves through a line 40. The structure in the zone 23 may be identical to that in the zone 22. For a more detailed description of the construction and operation of an electric emulsion treater, reference may be made to U.S. Patents Nos. 2,182,145 and 2,880,158.

The electrodes of the treater are energized from the additively-connected secondaries of high-voltage stepup transformers 50, 51 connected together at circuit ground with their high-voltage terminals being connected to the lines 26, 29. The primary of the transformer 50 is energized from an A.C. line through the power winding of a saturable core reactor 52. Similarly, the primary of the transformer 51 is energized from the A.C. line through the power winding of a saturable core reactor 53, the two transformers normally being identical and the two reactors normally being identical. In a typical installation, the stepup transformers are rated at 550 volts on the primary and 19,100 volts on the secondary, with the secondary having taps for lower voltage outputs.

In the voltage control system of FIG. 1, the power winding of the saturable core reactor is serially connected between the A.C. source and the transformer. The control winding of each reactor is energized from a D.C. current source 54, with the magnitude of the control winding current providing for control of the location of the knee of the saturable reactor characteristic.

The curves of FIGS. 4, 5, 6 and 7 are plots of load voltage vs. load current at the primary of the stepup transformer for various voltage control systems. Much higher voltages, substantially proportional to those shown, are applied to the electrodes to establish the emulsion-treating electric fields in the interelectrode treating spaces. Curve 56 of FIG. 4 illustrates the operating characteristics of the system for a fixed D.C. current in the saturable core reactor control winding, with this current adjusted to provide a zero load voltage at thirty amperes load current. The load voltage is substantially constant over the range of zero to twenty amperes load current and drops sharply to zero as the load current increases. This particular setting is used for a load in which the current normally varies in the range of fifteen to twenty amperes and the control system maintains the load voltage in the range of 450 to 475 volts while operating from a line voltage of 480 volts. This permits operation of the treater at substantially constant treating voltage as the load current varies from zero to twenty amperes while providing the desired overload protection when the load current exceeds the predetermined critical value of twenty amperes. The location of this knee or critical point is controlled by varying the magnitude of the D.C. current in the control winding. This control system achieves the other objective of the invention, i.e., maintaining load or treating voltage at substantially no-current voltage throughout the operating range, increasing the power factor, permitting reduction of the kva. rating of the equipment while maintaining the operating voltage and current, and reducing the zero load voltage requirements.

Curve 57 of FIG. 4 illustrates the operating characteristic of an air gap reactor system having the same kva. rating as the system of the curve 56. With the air gap reactor system, the load voltage at twenty amperes load is down at 320 volts, with very poor voltage regulation being achieved in the operating range. Curve 58 illustrates the characteristic of an air gap reactor which provides a load voltage of 450 volts at the twenty amperes load, indicating that a twenty kva. rated air gap reactor system is required to provide the same load voltage and current as a fourteen kva. rated saturable core reactor system.

A typical circuit for providing the D.C. current to the control winding is shown in FIG. 8. An A.C. source is connected at terminals 60, 61 to a variable transformer 62. The output from the variable transformer is connected as an input to a bridge rectifier 63 with the output of the rectifier connected to the control winding of the saturable core reactor 52. The setting of the variable transformer 62 is adjusted to provide the desired D.C. control winding current for the saturable core reactor and thereby the desired critical load current for the voltage control system. This adjustment is normally made when the system is put into operation and does not have to be changed until a different operating characteristic is desired or until the load is changed. Various other well known rectifier circuits may be utilized when desired and batteries are equally suitable, but usually not as practical.

Figure 2:
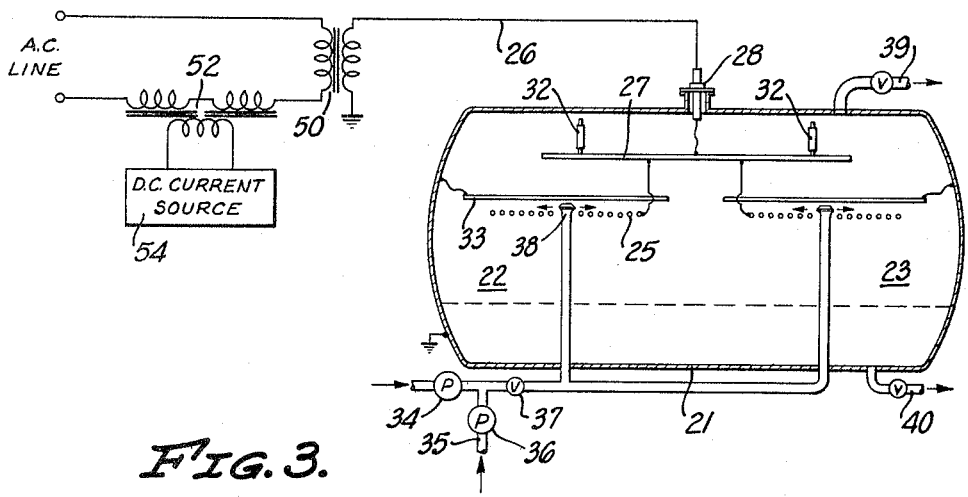
FIG. 2 is an illustration similar to that of FIG. 1 showing an alternative form of the invention.

In the system illustrated in FIG. 1, both electrodes of the treater are operated at a high potential with respect to ground. An alternative embodiment in which one electrode of the pair is maintained at ground potential is illustrated in FIG. 2. In this embodiment, components identical to those of FIG. 1 are identified by the same reference numerals. Only one transformer 50 is used, with one end of the secondary connected to ground and the high-voltage terminal connected to one of the electrodes, here the electrode 25. The other electrode of the pair may be connected to the container and hence to ground or, as shown in FIG. 2, the plurality of rods comprising the electrode 24 may be omitted with the grounded plate 33 serving as the electrode. A single saturable core reactor 52 is used in conjunction with the transformer 50. It should be noted that in a circuit arrangement of the type shown in FIG. 1, a single saturable core reactor and a single transformer with a center tapped secondary winding can be used in place of the two reactors and two transformers.

Figure 3:
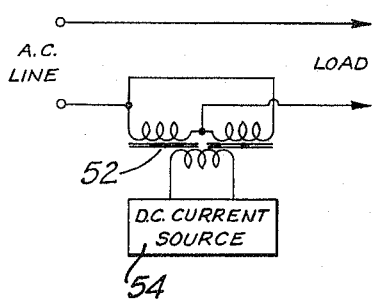
FIG. 3 is a diagram showing another alternative of a portion of the system of FIG. 1, with the reactor winding parallel connected.

In the circuits of FIGS. 1 and 2, the power winding of the saturable core reactor is series connected. An alternative form in which the power winding is parallel connected is shown in FIG. 3. The operation of the voltage control system of FIG. 3 is the same as that of the systems of FIGS. 1 and 2. The parallel connection sometimes is preferred because it causes less A.C. voltage to be induced into D.C. control winding.

Another embodiment of the D.C. current source for providing the control current to the reactor control winding is shown in FIG. 9. This circuit utilizes both voltage and current feedback from the load for improving the constant voltage portion of the performance curve. The circuit utilizes an amplifier 70 having a first input which varies as a function of load current and a second input which varies as a function of load voltage. A signal varying as a function of load current is produced by a current transformer 71, connected in one of the lines, and a bridge rectifier 72. A signal varying as a function of load voltage is obtained from the secondary of a transformer 73 having its primary connected across the load terminals, and a bridge rectifier 74. An A.C. power source for the amplifier is connected to terminals 75 and the amplifier output is connected to the control winding of the saturable core reactor 52. The amplifier is operated to increase the control winding current when the load voltage increases and to decrease the control winding current when the load current increases to shift the reactor to a new operating characteristic and maintain the load voltage substantially constant. This feedback system can be operated with only current feedback but very little improvement is achieved over the fixed bias current arrangement of FIG. 8.

A magnetic amplifier circuit suitable for use as the amplifier 70 of FIG. 9 is shown in FIG. 10. The D.C. output current is provided by a bridge rectifier 76 which is energized from a tapped autotransformer 77. The autotransformer is excited from the input terminal 75 through parallel connected main windings 78, 79 of the amplifier. A variable resistor 80 connected between the windings 78, 79 and in parallel with the rectifiers 81, 82 provides a gain control for the amplifier. The amplifier includes three control windings 83, 84, 85, with the load current signal connected to the control winding 83 and the load voltage signal connected to the control winding 84. A bias current is connected to the control winding 85 and is produced from a bridge rectifier 86, with a current limiting resistor 87 and a filter choke 88 in series with the winding 85. A potentiometer 89 provides for control of the bias current. The construction and operation of the magnetic amplifier is conventional and it is understood that various other amplifier circuits having similar characteristics can be used in the voltage control system of the invention.

The curve of FIG. 5 illustrates an alternative mode of operating the voltage control system of the invention. Normally, the saturable core reactor is excited with a relatively high D.C. current in the control winding for operating the system along the portion 92 of the curve of FIG. 5. This provides operation at substantially constant voltage for currrent loads considerably in excess of that achieved with the system providing the performance shown in curve 56 of FIG. 4. When the load exceeds the critical value indicated at point 93, the D.C. control winding current is reduced to provide operation along the portion 94 of the curve. The system continues to operate along this portion 94 until the load drops to the value at point 95, at which time the D.C. control winding current is increased to the original higher value, restoring operation in the desired range along the portion 92.

Various circuits may be used for the D.C. current source to provide the operation as illustrated in FIG. 5.

A preferred form of circuitry is shown in FIG. 11, wherein elements corresponding to those of previous figures are identified by the same reference numerals. The control winding of the saturable core reactor 52 is energized in part through A.C. terminals 60, 61, variable transformer 62, and bridge rectifier 63. Another rectifier 96 may be connected between the bridge rectifier and the control winding. The output from a bistable amplifier 97 is connected across the rectifier 96. The bistable amplifier is a circuit component which produces two stable output currents, typically zero current and a set value of current. The output of the bistable amplifier is switched between these two output values as a function of the input signals connected thereto. The current transformer 71 provides an input signal to the amplifier 97 through the bridge rectifier 72, this signal varying as a function of load current. Similarly, the voltage transformer 73 provides an input through the bridge rectifier 74, this signal varying as a function of load voltage. A.C. power is connected at the terminal 75.

The bistable amplifier 97 may be a magnetic amplifier such as that shown in FIG. 10. The amplifier should utilize core material which provides a substantially rectangular characteristic so that the change between the two output values will be stepwise in nature. In operation, the variable transformer 62 is adjusted so that with zero current from the amplifier 97, the system operates along the characteristic curve 94. Then the gain and bias of the bistable amplifier are set to provide an additional current to the control winding to produce operation along the characteristic curve 92 when the load is below the point 93. When the load exceeds this critical value, the output from the bistable amplifier is cut off, providing the desired switching control. The bistable amplifier will not be turned on until the point 95 is reached, at which time the combination of voltage and current feedback signal is such that the bistable amplifier is switched to the on condition returning the system to operation on the curve 92.

Bistable amplifiers of this type are conventional in nature. A suitable one for use with the present invention is manufactured by Norbatrol Electronics Corporation, Type 100C008. Various other circuits can be used, such as those including a silicon controlled rectifier and/or a relay. However, it is preferred to eliminate all moving contacts when possible. When desirable, additional current amplifications can be provided, such as by placing an amplifier between the bistable amplifier and the rectifier 96 or by placing an amplifier ahead of the control winding of the saturable core reactor.

Another form of the D.C. current source which provides both current feedback for improving the linearity of the constant voltage portion of the characteristic and switching between two magnitudes of control current for extending the range of the constant voltage portion is shown in FIG. 12, with a characteristic curve thereof shown in FIG. 6. An amplifier, such as the magnetic amplifier 70 of FIG. 9, provides the current for the control winding of the saturable core reactor. A variable resistor 100 is placed in series with the control winding to provide an adjustment. The current transformer 71 provides an input to the amplifier 70 which varies as a function of load current. The bistable amplifier 97 provides another input to the magnetic amplifier, the bistable amplifier functioning in the same manner as in the circuit of FIG. 11. Another variable resistor 101 between the two amplifiers provides for adjustment of the input signal from the bistable amplifier. The current transformer 71 and the voltage transformer 73 provide a load current input signal and a load voltage input signal, with a variable resistor 102 providing for adjustment of one of the signals. The circuit of FIG. 12 operates in the same manner as the circuit of FIG. 11. The FIG. 12 circuit is somewhat more expensive and normally is used only where a more gradual return to full voltage from short circuit is desired, usually used when load is extremely unstable.

Another form of the D.C. current source for providing switching between two magnitudes of control winding current is shown in FIG. 13, with the characteristic curve produced thereby shown in FIG. 7. The D.C. current for the control winding is provided through the auto-transformer 62, a pair of silicon controlled rectifiers 105, 106 with shunting resistors 107, 108, and the bridge rectifier 63. A signal varying as a function of load current and and a signal varying as a function of control winding current are bucked against each other to provide a control voltage for the silicon controlled rectifiers. The load current signal is developed across a variable resistor 109 by the current transformer 71 and the bridge rectifier 72. The control winding current signal is developed across a variable resistor 110 by another current transformer 71' and bridge rectifier 72'. Capacitors 111 and 112 provide filtering of the rectified signals.

The curves of FIGS. 4, 5, 6 and 7 are based on tests run on the system of FIG. 1 utilizing two 15 kva. saturable core reactors and a line voltage of 480 volts. Using the constant current control winding operation of FIG. 4, a 30% increase in usable connected load over an air gap reactor system is achieved. Using the switching operation of FIG. 5, an increase in usable connected load of 75% is obtained.

The data of Tables I and II was obtained by operating two identical treaters as shown in FIG. 1 in electrically desalting the same oil, one using a pair of conventional 15 kva. air gap reactors (Unit #2) and the other using a pair of 15 kva. saturable core reactors (Unit #1). The D.C. current source of FIG. 11 providing the characteristic of FIG. 5 was used for the saturable core reactor connected to the lower electrode 25; the D.C. current source of FIG. 8 providing the characteristic of curve 56 of FIG. 4 was used for the saturable core reactor connected to the upper electrode 24.

Table I

|  | Unit #1 | Unit #2 |
|---|---|---|
| Flow Rate, bbls. per day | 4,000 | 4,000 |
| Salt—Raw Crude, p.t.b | 32.8 | 32.8 |
| Salt—Desalted Crude, p.t.b | 7.7 | 9.3 |
| Salt Removal, percent | 76.5 | 71.7 |
| BS & W—Desalted Crude, percent | .10 | .14 |
| Voltage to ground: | | |
| Upper Electrode 24, volts | 378 | 272 |
| Lower Electrode 25, volts | 428 | 272 |
| Current: | | |
| Upper Electrode, amperes | 26.0 | 23.0 |
| Lower Electrode, amperes | 26.2 | 22.2 |

Table II

|  | Unit #1 | Unit #2 |
|---|---|---|
| Flow Rate, bbls. per day | 4,000 | 4,000 |
| Salt—Desalted Crude, p.t.b | 5.2 | 5.7 |
| BS & W—Desalted Crude, percent | .12 | .16 |
| Voltage to ground: | | |
| Upper Electrode 24, volts | 378 | 272 |
| Lower Electrode 25, volts | 428 | 272 |
| Current: | | |
| Upper Electrode, amperes | 26.0 | 23.0 |
| Lower Electrode, amperes | 26.2 | 22.3 |

BS & W—bottom settlings and water as measured in the treated oil.
p.t.b.—pounds per thousand barrels.

Voltages and currents were measured at the primary side of the stepup transformer. The voltage on the upper electrode 24 had to be limited to the value shown because of the close proximity of the grounded plate 33 in this particular treater. In new treaters the spacing between the plate 33 and the electrode 24 can be increased to permit higher operating voltages.

In another instance two electric desalters constructed as in FIG. 1 were compared, one using a pair of conventional 75 kva. air gap reactors and the other a pair of 75 kva. saturable core reactors as in FIGS. 1 and 11 to produce the characteristic curves of FIG. 5. An increase in usable connected load of 100% and an increase in power factor of 100% were obtained from the latter. The power factor in the latter was maintained at unity to 60 kva. load per saturable core reactor and dropped only to .95 at 75 kva. load. The load voltage was maintained at 90% of line voltage at the critical switching point 93 with substantial betterment in emulsion-resolving effectiveness as evidenced by the fact that the BS & W content of the desalted crude varied between .4–.5% with the saturable reactor control, as compared with .5–1% with the air gap reactors.

In the examples given above, the voltage control system of the invention was substituted for an existing air gap reactor system. Hence the same kva. ratings and line voltages were used, resulting in an increase in load voltage and current. In making a new electrical installation it is sometimes preferable to maintain the load voltages and current and decrease the kva. and/or line voltage of the control system, thereby substantially reducing the cost of the installation.

Figure 14:
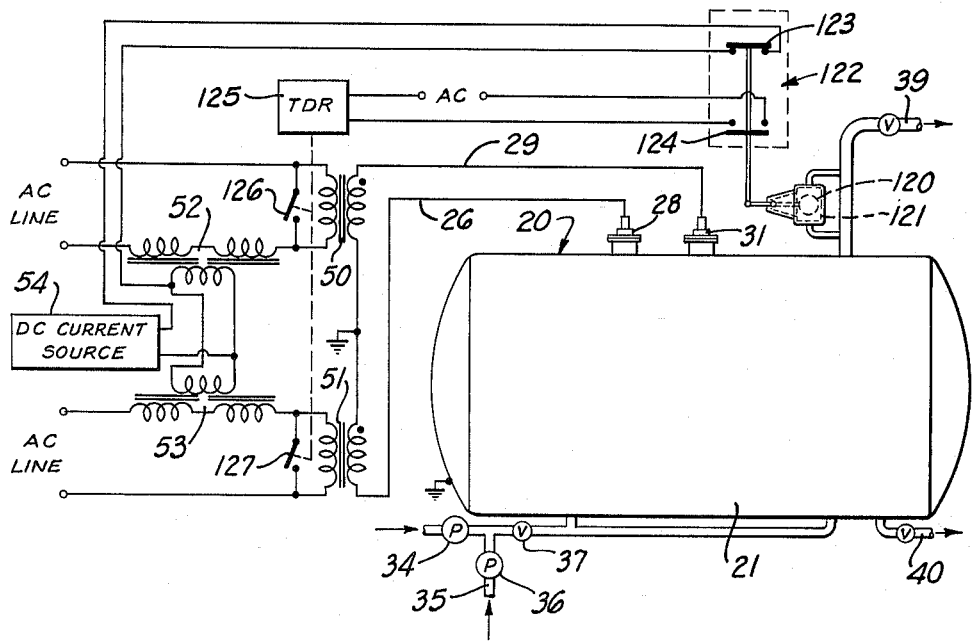
FIG. 14 is a diagrammatic illustration of another embodiment of the invention illustrating the low level control system.

FIG. 14 illustrates a modification of the voltage control system which provides for reducing the electrode voltage to zero when the oil level in the treater falls below a safe point. The system is shown as a modification of the system of FIG. 1 but is equally adaptable to other embodiments of the invention. A fluid level responsive device is incorporated in the treater 20. This device may take various forms and is disclosed herein as a float 120 disposed in a chamber 121 coupled into the oil outlet line 39. The float actuates a switch unit 122 which has a normally closed contact set 123 and a normally open contact set 124. The normally closed contact set is connected in series between the D.C. current source 54 and the control windings of the saturable core reactors 52, 53. The normally open contact set is connected in series between a time delay relay 125 and a power source such as the A.C. line. The relay 125 has a pair of contact sets 126, 127 connected for shorting the primaries of the transformers 50, 51, respectively.

The system of FIG. 14 operates in the same manner as the system of FIG. 1 under normal operating conditions. If for any reason the fluid level in the chamber 121 decreases, the float 120 will drop, actuating the switch unit 122. The contact set 123 is opened and the contact set 124 is closed. Opening of the contact set 123 shuts of D.C. current to the control current windings of the saturable core reactors causing a substantial increase in impedance of each reactor and a corresponding reduction in load current to ten percent or less of rated load current. The time delay relay 125 is energized when the contact set 124 is closed and the contact sets 126, 127 are closed a short time later. The time delay between the opening of the circuit coupling the D.C. current source to the control current windings and the shorting of the transformer primaries is desirable because of the time required for decay of the D.C. fields in the reactors. Typically the time delay relay will be set to actuate the shorting switches in one to two seconds.

This liquid level safety system provides positive reduction of electrode voltages, places all of the switching contacts outside the container, and requires switching only at low levels. No high current circuits have to be interrupted or closed by mechanical contacts, thus permitting the use of small and inexpensive switching components. Of course, various modifications of the switching circuitry will immediately be apparent to those skilled in the art. If for some reason it is desired not to open the control current windings, a resistor can be switched into the circuit between the D.C. current source and the control current windings. Similarly, the transformer windings can be shunted by suitable impedance rather than being directly shorted if desired. Also, the transformer shorting may be carried out on the secondary side to provide a direct short on the electrodes when desired.

Although exemplary embodiments have been illustrated and described, it will be apparent that the invention is applicable to various electric emulsion treaters and other varying-current loads. In the field of electric emulsion treatment the invention is excellently suited to the dehydration or desalting of crude oil and to the removal of dispersed conductive material from other oils. The term emulsion as herein used is definitive of dispersions ranging from mere temporary dispersions that will settle on standing to the emulsions stabilized to such extent as not to settle substantially on prolonged standing.

We claim as our invention:

1. In a voltage control system for an electric emulsion treater or the like which produces a randomly varying current load at a pair of load terminals, the combination of:
   A.C. power source terminals;
   saturable core reactor means connected between said source terminals and said load terminals for controlling power transmission to the load, said reactor means including a D.C. control winding and having a voltage-current characteristic with a substantially constant voltage portion and a knee;
   a D.C. current source;
   means for connecting said D.C. source to said control winding, said means including a rectifier;
   a bistable control unit having first and second inputs and a D.C. output, said output having two stable current values;
   means for connecting said D.C. output across said rectifier;
   means for generating a first D.C. signal varying as a function of the load current;
   means for generating a second D.C. signal varying as a function of the load voltage; and
   means for connecting said first and second signals as inputs to said control unit for switching said control unit from the higher current output to the lower current output when the load exceeds a preset critical value.

2. In a voltage control system for an electric emulsion treater or the like which produces a randomly varying current load at a pair of load terminals, the combination of:
   A.C. power source terminals;
   saturable core reactor means connected between said source terminals and said load terminals for controlling power transmission to the load, said reactor means including a D.C. control winding and having a voltage-current characteristic with a substantially constant voltage portion and a knee;
   an amplifier having first and second inputs and a D.C. output with the output current varying as a function of each of the input currents;
   means for connecting said amplifier output to said control winding;
   a bistable control unit having first and second inputs and a D.C. output, said output having two stable current values;
   means for generating a first D.C. signal varying as a function of the load current;
   means for generating a second D.C. signal varying as a function of the load voltage;
   means for connecting said first and second signals as inputs to said control unit for switching said control unit from the higher current output to the lower current output when the load exceeds a preset critical value; and
   means for connecting said first signal as an input to said amplifier for increasing the control winding current as the load current increases up to the critical value, and means for connecting the control unit output as an input to said amplifier for decreasing the control winding current when the load exceeds the preset critical value.

3. In a voltage control system for an electric emulsion treater or the like which produces a randomly varying current load at a pair of load terminals, the combination of:

A.C. power source terminals;
saturable core reactor means connected between said source terminals and said load terminals for controlling power transmission to the load, said reactor means including a D.C. control winding and having a voltage-current characteristic with a substantially constant voltage portion and a knee;
A.C. to D.C. rectifier means;
circuit means for connecting the D.C. output of said rectifier means to said control winding;
means for varying the A.C. input to said rectifier means including a parallel connected control rectifier and resistor connected between the A.C. power source and said rectifier means;
means for generating a first D.C. signal varying as a function of the load current;
means for generating a second D.C. signal varying as a function of the rectifier means current; and
means for combining said first and second signals in canceling relation for controlling said controlled rectifier to increase the control winding current as the load current increases to a critical value and to sharply decrease the control winding current when the load current exceeds such critical value.

4. In a voltage control system for an electric emulsion treater or the like which produces a randomly varying current load at a pair of load terminals, the combination of:

A.C. power source terminals;
saturable core reactor means connected between said source terminals and said load terminals for controlling power transmission to the load, said reactor means having a control winding and a voltage-current characteristic with a substantially constant voltage portion and a knee;
a D.C. current source having two output current values, said source being shiftable from one of said output currents to the other and return;
circuit means for connecting said D.C. source to the control winding of said reactor means;
means for generating a load signal varying as a function of the magnitude of the load current; and
control means having said load signal as an input for automatically switching the D.C. output current from said source from the higher value to the lower value when the load exceeds a predetermined first critical point and automatically switching back to the higher value when the load falls below a predetermined lower critical point for maintaining said reactor means in the substantially constant voltage condition at the normal load current below the first critical point permitting operation at the substantially constant voltage with increased loads before reaching said knee and providing operation at reduced voltage when the first critical point is exceeded.

5. In a voltage control system for a randomly varying load in the form of an electric emulsion treater, the combination of:

A.C. power source terminals;
high voltage stepup transformer means having a primary and a secondary;
saturable core reactor means connected between said source terminals and said primary for controlling power transmisison to said primary, said reactor means having a control winding and first and second voltage-current characteristics with substantially identical and constant voltage portions up to knees determined by the control winding current;
a D.C. current source providing first and second D.C. output currents for operating said reactor means on said first and second characteristics respectively;
circuit means for connecting said D.C. source to the control winding of said reactor means;
a container for fluid to be treated and including an inlet and upper and lower outlets for fluid flow therethrough;
a pair of electrodes mounted within said container in spaced relation for fluid flow therebetween;
circuit means for connecting said secondary to said pair of electrodes to apply a high electrical potential between said electrodes; and
control means for switching said D.C. current source from said first output current to said second output current when the load current exceeds a predetermined critical value to switch the system from operation above the knee on said first characteristic to operation below the knee on said second characteristic.

6. In a voltage control system for a randomly varying load in the form of an electric emulsion treater, the combination of:

A.C. power source terminals;
high voltage stepup transformer means having a primary and a secondary;
saturable core reactor means connected between said source terminals and said primary for controlling power transmission to said primary, said reactor means having a control winding and a voltage-current characteristic with a substantially constant voltage portion and a knee with the location of the knee controlled by the bias current in the control winding of said reactor means;
a D.C. current source;
circuit means for connecting said D.C. source to said control winding to provide the bias current;
a container for fluid to be treated and including an inlet and upper and lower outlets for fluid flow therethrough;
a pair of electrodes mounted within said container in spaced relation for fluid flow therebetween;
circuit means for connecting said secondary to said pair of electrodes to apply a high electrical potential between said electrodes; and
means for varying the D.C. current from said source for setting said reactor means in the substantially constant voltage condition at the normal load current of the electrodes thereby permitting operation at the substantially constant voltage with increased loads before reaching said knee with said setting maintained constant during operation of the system.

7. An apparatus as defined in claim 6 in which said transformer means comprises a pair of high voltage stepup transformers, each having a primary and a secondary, and said saturable core reactor means comprises a pair of saturable core reactors, each connected between said source terminals and a transformer primary respectively for controlling power transmission to the primary, and with said transformer secondaries connected in series aiding and to said pair of electrodes, with the common point of said secondaries and said container connected to circuit ground.

8. An apparatus as defined in claim 6 in which said transformer means comprises a high voltage stepup transformer having a primary and a secondary, and said saturable core reactor means comprises a saturable core reactor having a power winding and a control winding, with said power winding connected between said source terminals and said primary, and with one of said electrodes connected to said container and to circuit ground, and with said transformer secondary connected between the other of said electrodes and circuit ground.

9. An apparatus as defined in claim 6 in which said saturable core reactor means includes a power winding in two sections and a control winding, with the power winding sections connected in parallel between a source terminal and the primary for controlling power transmission to said primary.

10. In a voltage control system for a randomly varying load in the form of an electric emulsion treater, the combination of:

A.C. power source terminals;
high voltage stepup transformer means having a primary and a secondary;
saturable core reactor means connected between said source terminals and said primary for controlling power transmission to said primary and having a control winding;
a D.C. current source;
circuit means for connecting said D.C. source to the control winding of said reactor means and including a first switch means for decreasing the D.C. current from said source to said winding;
a second switch means for shunting at least one winding of said transformer means;
a container for fluid to be treated and including an inlet and upper and lower outlets for fluid flow therethrough;
a pair of electrodes mounted within said container in spaced relation for fluid flow therebetween;
circuit means for connecting said secondary to said pair of electrodes to apply a high electrical potential between said electrodes; and
fluid level responsive switch means for actuating said first and second switch means when the fluid content in said container falls below a predetermined level to sequentially decrease the reactor control current and shunt the transformer means.

11. In a voltage control system for a randomly varying load in the form of an electric emulsion treater, the combination of:

A.C. power source terminals;
high voltage stepup transformer means having a primary and a secondary;
saturable core reactor means connected between said source terminals and said primary for controlling power transmission to said primary and having a control winding;
a D.C. current source;
first switch means for connecting said D.C. source to the control winding of said reactor means;
second switch means for shorting said transformer means, said second switch means including time delay means for introducing a predetermined time interval between the actuation of said second switch means and the shorting of said transformer means;
a container for fluid to be treated and including an inlet and upper and lower outlets for fluid flow therethrough;
a pair of electrodes mounted within said container in spaced relation for fluid flow therebetween;
circuit means for connecting said secondary to said pair of electrodes to apply a high electrical potential between said electrodes; and
a fluid level responsive means for actuating said first and second switch means when the fluid level in said container falls below a predetermined value.

12. In a voltage control system for a randomly varying load in the form of an electric emulsion treater, the combination of:

A.C. power source terminals;
a pair of high voltage stepup transformers, each having a primary and a secondary;
a pair of saturable core reactors, each connected between said source terminals and a transformer primary respectively for controlling power transmission to the primary and each having a control winding;
a D.C. current source;
first switch means for connecting said D.C. source to the control winding of each of said reactors;
second switch means for shorting the primary of each of said transformers;
a container for fluid to be treated and including an inlet and upper and lower outlets for fluid flow therethrough;
a pair of electrodes mounted within said container in spaced relation for fluid flow therebetween;
circuit means for connecting said secondaries in series aiding and to said pair of electrodes to apply a high electrical potential between said electrodes, with the common point of said secondaries and said container connected to circuit ground; and
switch control means actuated as a function of fluid level in said container for controlling said first switch means to disconnect said D.C. source from said control windings and then short each of said primaries when the container fluid level decreases to a predetermined point.

References Cited by the Examiner

UNITED STATES PATENTS

| 2,033,129 | 3/1936 | Eddy | 204—305 |
| 2,049,561 | 8/1936 | Grave | 204—305 |
| 2,096,774 | 10/1937 | Wolfe | 204—305 |
| 2,182,145 | 12/1939 | Eddy | 204—308 |
| 2,310,886 | 2/1943 | Wentz | 323—61 |
| 2,681,311 | 6/1954 | De Wit | 204—302 |
| 2,735,979 | 2/1956 | Coben | 323—61 X |
| 2,790,127 | 4/1957 | Hamilton | 321—25 X |
| 2,858,499 | 10/1958 | Silver | 321—25 X |
| 2,871,177 | 1/1959 | Comstock | 204—228 |
| 3,042,848 | 7/1962 | Muchnick et al. | 321—25 X |
| 3,080,517 | 3/1963 | Borkovitz | 323—89 X |

JOHN H. MACK, *Primary Examiner.*

MURRAY TILLMAN, *Examiner.*

G. BATTIST, T. TUFARIELLO, *Assistant Examiners.*